June 28, 1966 R. N. FREEMAN Re. 26,047

PROPELLER BALANCING DEVICE

Original Filed July 27, 1962 2 Sheets-Sheet 1

INVENTOR.
RICHARD N. FREEMAN
BY Williams, David, Hoffmann & Yount.
ATTORNEYS

PROPELLER BALANCING DEVICE

Original Filed July 27, 1962 2 Sheets-Sheet 2

INVENTOR.
RICHARD N. FREEMAN
BY Williams, David, Hoffmann & Yount.
ATTORNEYS

United States Patent Office

Re. 26,047
Reissued June 28, 1966

26,047
PROPELLER BALANCING DEVICE

Richard N. Freeman, Eisenhower Drive, R.D. 3, Willoughby, Ohio

Original No. 3,148,545, dated Sept. 15, 1964, Ser. No. 212,842, July 27, 1962. Application for reissue Nov. 19, 1964, Ser. No. 427,526
5 Claims. (Cl. 73—455)

Matter enclosed in heavy brackets [ ] appears in the original patent but forms no part of this reissue specification; matter printed in italics indicates the additions made by reissue.

This invention relates to testing devices and more particularly to a device for testing the static balance of a propeller, such as for model airplanes.

The principal object of the present invention is to provide a novel testing device of an extremely simple and highly practical form for determining whether the blades of a propeller are of equal weight or are in balance with respect to each other.

Another object of the invention is to provide a device for statically testing the balance of a propeller comprising, in general, a pendulated carrier adapted to receive the propeller and mounted for free swinging movement and including an indicator member, and a support for the carrier having a reference means thereon relative to which the indicator member is movable during the test.

Other objects inherent in the nature and character of the device disclosed will be apparent to those skilled in the art from the drawings, and from the detailed description which follows.

In the accompanying drawings and forming a part of this specification,

Figure 2:
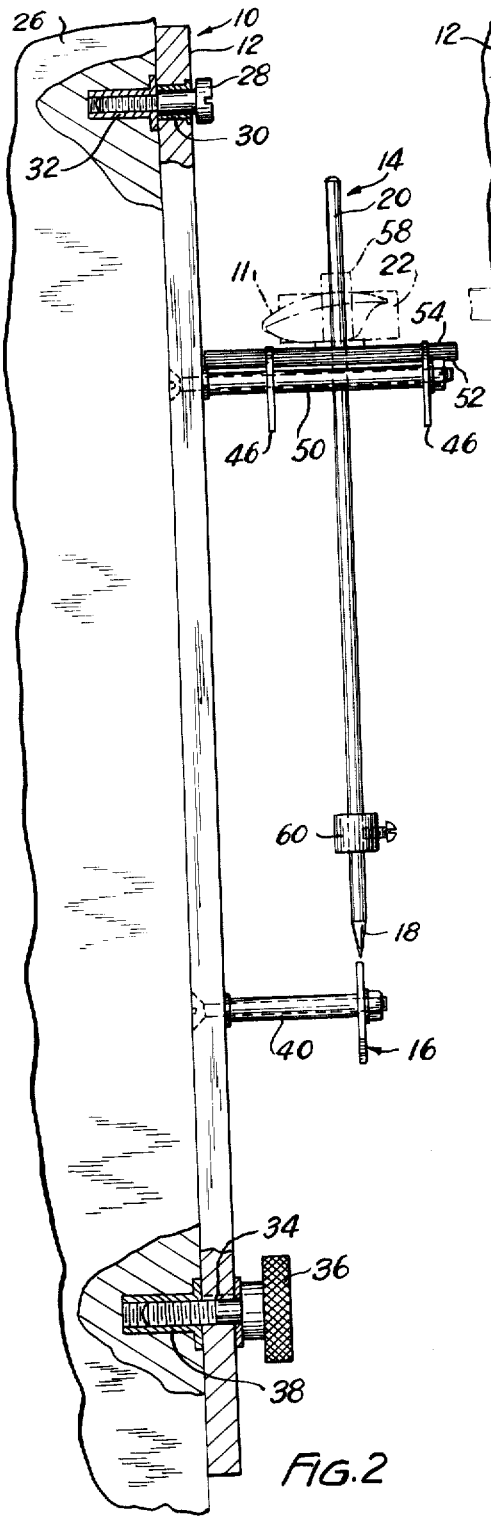
FIG. 2 is a side elevational view of the balancing device with portions thereof in cross section.
Figure 1:
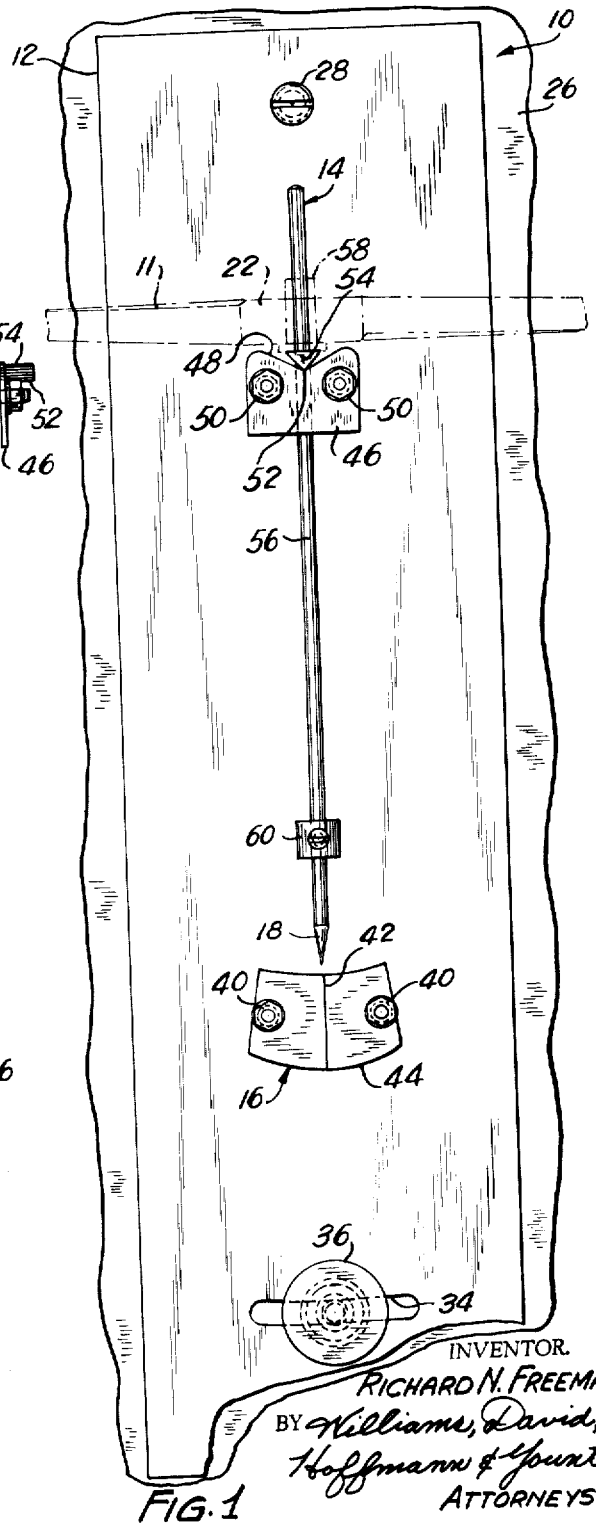
FIG. 1 is a front elevational view of the novel propeller balancing device and in which a portion of a propeller is shown in phantom lines.

In FIGS. 1 and 2 of the drawing a testing device 10 is shown which is usable in testing the static balance of an airplane propeller 11. The device 10 comprises in general a support 12 as the base of the device and a pendulated carrier 14 adapted to receive the propeller thereon and mounted on the support for swinging relative thereto. The device 10 also comprises reference means 16 on the support 12 and an indicator member 18 on the carrier and movable therewith relative to the reference means. The carrier 14 includes a projection member 20 adapted to receive the hub 22 of the propeller 11 in the manner explained hereinafter.

The support member 12 is of a suitable shape and here shown in the form of a flat upright plate member having the upper end portion thereof pivotally mounted on a substantially vertical wall 26 by means of a bolt 28 passing through a sleeved aperture 30 in the upper end of the support member. The bolt 28 has a threaded end portion adapted to be screwed into a hollowed flange lead plug 32 inserted in the wall 26. The lower end of the support member is provided with an arcuate slot 34, the radial center of which is aperture 30, and which is adapted to receive a knurled-head bolt 36 therethrough. The bolt 36 has a threaded end portion adapted to be screwed into a second hollowed flange lead plug 38 inserted in the wall and to clamp the support member in a predetermined position along the arcuate slot.

The reference means 16 is positioned in projecting relation to the face of the support member 12 near the bottom thereof by a pair of spacer-sleeved rods 40 and constitutes a vertical line 42 scored in or marked on the surface of a flat plate 44.

The support member 12 [is] further *includes a horizontal projecting means detachably connected with the upright plate and* provided with a pair of spaced flat plates 46 having V-shaped bearing surfaces 48 along the top edges thereof and disposed at right angles to and in spaced relation to the face of the support member near the top thereof by a second pair of spacer-sleeved rods 50. *As shown in FIGS. 1 and 2, the sleeved rods 50 are detachably connected to the upright plate via screws which extend through the plate and the sleeved rods 50 and nuts threadably engaged with the screws at their outer ends.*

The pendulated carrier 14 is substantially T-shaped in configuration, having a cross bar 54 and a longitudinal rod 56, and is adapted to be supported for free swinging movement on and between the V-shaped bearing surfaces 48 by the knife edge 52 along the bottom of the cross bar 54; the top of the cross bar is preferably flat, thus the cross bar in cross section is triangular.

The projection member 20 above the cross bar 54 and the indicator member 18 below the cross bar in essence constitute the longitudinal rod 56 which is suitably pointed at its lower end to form the indicator member. As previously stated, the projection member is adapted to receive the hub 22 of a propeller 11 at its axis, as shown in phantom line in FIGS. 1 and 2. A bushing 58, also shown in phantom line, may be slipped over the projection member and seated on the top of the cross bar, depending upon the size of the opening in the hub of the propeller.

A weighted collar 60 may be clamped on the longitudinal rod 56 near the indicator member below the cross bar in order to provide an appropriate mass on the carrier to give the latter a pendulum action under the influence of gravity.

In the operation of the embodiment described above the support member is freely pivotally hung from the substantially vertical wall 26 by the bolt 28. The cross bar 54 of the pendulated carrier 14 is mounted upon the V-shaped bearing surfaces so that the longitudinal rod projects downwardly between the spacer-sleeved rods 50. Before the propeller 11 is placed on the carrier, the device is initially calibrated by bringing the reference line 42 into aligned condition with the indicator member 18. This is readily done inasmuch as both the support member 12 and carrier 14 will be subject to the action of gravity and will assume exactly vertical positions. Inasmuch as the carrier may swing more freely than the support member if the latter should bind slightly in its installed position the bottom of the support member may be swung in an arc until the vertical line 42 of the reference means 16 is brought into vertical alignment with the indicator member 18 and then clamped tightly in the aligned position by the knurled-headed bolt 36.

When the propeller is thereafter placed on the pendulated carrier so that the blades of the propeller are at right angles with respect to the cross bar 54, the unbalanced condition of the propeller will show up by movement of the indicator member 18 out of alignment with the line 42 of the reference means 16. Once the unbalanced condition of the propeller has thus been ascertained, the operator uses sand paper or the like on the heavier blade of the propeller, in the case of model plane propellers, and removes enough material to produce an exactly balanced condition, as shown in FIG. 1. Obviously, in the case of larger propellers of metal and the like, the heavier blade may be brought into balance relative to the other blade by removal of material in a suitable manner. It will be noted from FIG. 1 that the axis of the hub 22 of the propeller 11, the indicator means 18 and the vertical line 42 of the reference member 16 will be in vertical alignment when the propeller is in balance.

Figure 4:
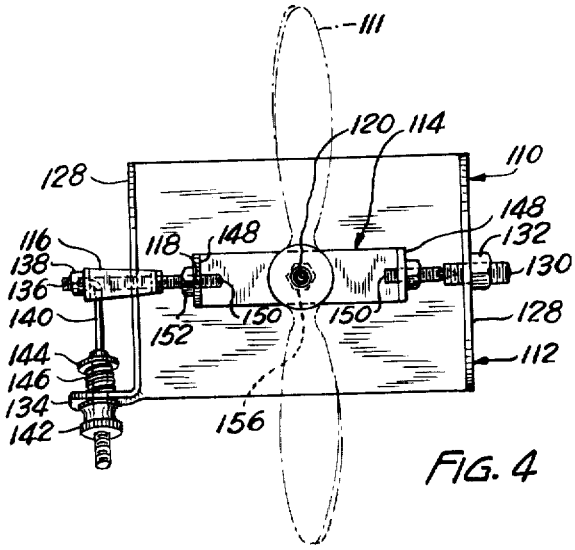
FIG. 4 is a plan view of the device of FIG. 3.
Figure 3:
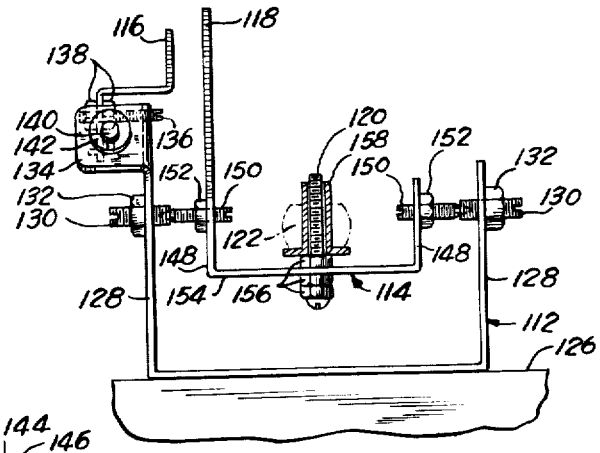
FIG. 3 is a side elevational view partly in cross section illustrating a modification of the propeller balancing device.
Figure 5:
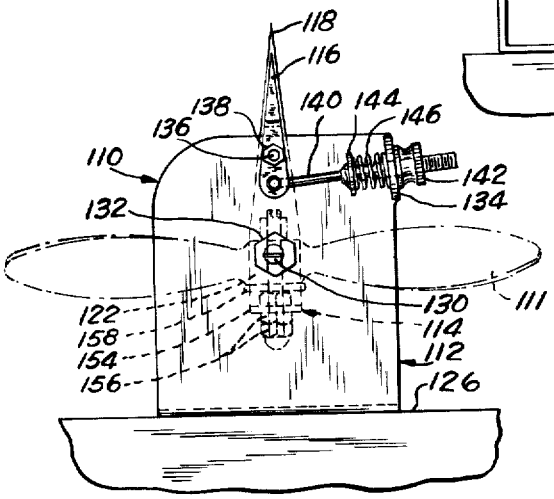
FIG. 5 is a front elevational view of the device of FIG. 3.

FIGS. 3, 4 and 5 of the drawings illustrate a modification of a propeller static balancing device 110. The device also comprises in general a support member 112 as the base of the device, a pendulated carrier 114, a reference member 116, an indicator member 118, and a projection member 120 adapted to receive the hub 122 of a propeller 111 at its axis.

The support member 112, a U-shaped bracket, is adapted to be placed on a substantially level or horizontal surface 126, and has upright standards 128 each having an aperture therein near the upper end within which is received a pivot bearing in the form of a recessed bearing pin 130. Each bearing pin is threaded and may be adjustably screwed inwardly or outwardly of the upright standard and held in the desired adjusted position by a nut 132.

The support member 112 is further provided with an apertured ear or lug 134 bent outwardly at right angles with respect to and at the upper end of one of the upright standards 128, and bent slightly at an inclined angle relative to the upright standard, as may be observed from FIGS. 3, 4 and 5. The purpose of this ear or lug will be described below.

The reference member 116, substantially Z-shaped in configuration and pointed, at its upper end, is pivotally mounted on the outside of the one upright standard 128 having the lug 134 by means of a threaded rod 136, the reference member being held in position on the threaded rod between two nuts 138. The pointed end of the reference member may be adjustably swung in an arc by means of a lever 140 which is pivotally connected to the lower end of the member and which has a threaded end portion adapted to be received through the apertured ear or lug 134 and screwed into a thumb nut 142. A flanged disc 144 is fixed on the lever so that a helical spring 146 may abut thereagainst and between the disc and the lug in compression, thus serving to hold steadily the reference member in the predetermined position.

The pendulated carrier 114 is substantially U-shaped in configuration and has upright arms 148, one of the upright arms 148 extending substantially above the other arm and constituting a pointed indicator member 118. Each upright arm 148 is provided with an aperture within which is received a pivot pin 150. Each pivot pin is threaded similarly as the recessed bearing pins 130 in the support member and may be adjustably screwed inwardly or outwardly of the upright arm 148 and held in the desired adjusted position by a nut 152. The one end of each pivot pin outwardly of the U-shaped carrier is pointed or conical shaped and is adapted to be received within the recess of a bearing pin 130. Either or both the pivot pin and bearing pin may be adjusted inwardly or outwardly of the structures on which they are mounted to obtain optimum free swinging movement of the carrier relative to the support member.

The projection member 120, as illustrated in FIG. 3, may constitute a screw passing through an aperture in the central portion of the base 154 of the carrier and clamped in position by nuts 156. The nuts provide an appropriate mass on the carrier to give the latter a pendulum action under the influence of gravity. A bushing 158 may or may not be slipped over the projection member and seated on top of one of the nuts 156, depending upon the size of the opening in the hub 122 of the propeller 111.

In the operation of the modification of FIGS. 3, 4 and 5 described above, the support member 112 is placed upon a substantially level or horizontal surface 126 and, before placing the propeller 111 on the pendulated carrier 114, the device is initially calibrated by operating the thumb nut 142 to swing the reference member 116 into aligned condition with the indicator member 118. This is readily done inasmuch as the indicator member 118 on the carrier 114 will be subject to the action of gravity and will assume exactly a vertical position. The reference member is then brought into transverse alignment with the indicator member.

When the propeller is thereafter placed on the pendulated carrier its unbalanced condition is readily ascertained if the indicator member is out of alignment with the reference member. The operator similarly corrects the unbalanced condition in the manner aforedescribed to obtain an exactly balanced condition, as shown in FIG. 5. It will be noted from the combined illustrations of FIGS. 3, 4 and 5 that the axis of the hub 122 of the propeller 111, the indicator member 118 and the reference member 116 will be in transverse alignment when the propeller is in balance.

It should be apparent that other elements could be utilized to carry out the functions of either device, such as jewels on the U-shaped carrier of FIGS. 3, 4 and 5 and screw pins on the support member 112, for example, without departing from the scope of the invention.

It may now be seen that the device for testing the static balance of a propeller is comparatively simple and economical in construction and materials, requiring relatively few parts, and easily operated to determine the nature of the balance of the blades of a propeller.

Having described my invention, I claim:

1. In apparatus for static balance testing of a model airplane propeller of the kind having a hub and blades projecting therefrom, a base comprising a vertical plate for positioning adjacent an upright support wall; bracket means projecting horizontally from said plate and having a slot-like opening; said bracket means comprising a pair of bearing members lying in spaced vertical planes extending parallel to said plate and having V-shaped upper bearing edges adjacent one pair of opposed sides of said opening; a pendulated carrier extending through said opening including cross-bar means having knife-edge portions rockably supported on said bearing edges for swinging of said carrier; said carrier having an upper stem portion extending above said cross-bar means for receiving the propeller hub thereon and a weighted lower portion depending from said cross-bar means; reference means supported by said plate; and indicator means on said lower portion of the carrier and co-operable with said reference means for indicating the condition of balance of the propeller.

2. Apparatus according to claim 1 wherein the bearing members of said bracket means comprise vertically-edgewise-disposed plate members; and rod and spacer means on the other pair of opposed sides of said opening for connecting said bearing members with said plate and holding the bearing members in said spaced vertical planes.

3. In apparatus for static balance testing of a model airplane propeller of the kind having a hub and blades projecting therefrom; a base comprising a vertical plate for positioning adjacent an upright support wall; bracket means projecting horizontally from said plate and having a slot-like opening; said bracket means comprising a pair of bearing members lying in spaced vertical planes extending parallel to said plate and having V-shaped upper bearing edges adjacent one pair of opposed sides of said opening; a pendulated carrier extending through said opening including cross-bar means having knife-edge portions rockably supported on said bearing edges for swinging of said carrier; said carrier having an upper stem portion extending above said cross-bar means for receiving the propeller hub thereon and a weighted lower portion depending from said cross-bar means; reference means supported by said plate; indicator means on said lower portion of the carrier and co-operable with said reference means for indicating the condition of balance of the propeller; and calibrating means comprising pivot means connecting said plate with said wall for an adjusting swinging of the plate to bring said reference means into an aligned relation with said indicator means before the propeller is mounted on said carrier.

4. In apparatus for static balance testing of a model airplane propeller of the kind having a hub and blades projecting therefrom; a base comprising a vertical plate for positioning adjacent an upright support wall; bracket means projecting horizontally from said plate and having a slot-like opening; said bracket means comprising a pair of bearing members lying in spaced vertical planes extending parallel to said plate and having V-shaped upper bearing edges adjacent one pair of opposed sides of said opening; a pendulated carrier extending through said opening including cross-bar means having knife-edge portions rockably supported on said bearing edges for swinging of said carrier; said carrier having an upper stem portion extending above said cross-bar means for receiving the propeller hub thereon and a weighted lower portion depending from said cross-bar means; reference means supported by said plate; indicator means on said lower portion of the carrier and co-operable with said reference means for indicating the condition of balance of the propeller; calibrating means comprising pivot means connecting said plate with said wall for an adjusting swinging of the plate to bring said reference means into an aligned relation with said indicator means before the propeller is mounted on said carrier; and securing means for retaining said plate in its adjustably swung position.

*5. In apparatus for static balance testing of a model airplane propeller of the kind having a hub and blades projecting therefrom; a base comprising upright plate means; means detachably connected with said upright plate means and projecting generally horizontally therefrom, said support means comprising a pair of bearing members having bearing surfaces spaced from each other and from said upright plate means; a pendulated carrier disposed between said bearing members and having a weighted lower portion and an upwardly extending projection member located between said bearing members for receiving the propeller hub at its axis thereon; said carrier having horizontally extending means pivotally supported on said spaced bearing surfaces of said bearing members for gravity swinging of said carrier about a horizontal axis; reference means on said upright plate means; an indicator member on said carrier and movable therewith relative to said reference means for indicating the condition of balance of the propeller; and calibrating means providing for movement of said reference means for transverse alignment with said indicator member prior to placing a propeller on said carrier.*

References Cited by the Examiner

The following references, cited by the Examiner, are of record in the patented file of this patent or the original patent.

UNITED STATES PATENTS

| | | | |
|---|---|---|---|
| 710,148 | 9/1902 | Hodgkinson | 73—482 |
| 1,091,708 | 3/1914 | Riddell | 73—483 |
| 1,352,905 | 9/1920 | Machrol | 73—483 |
| 2,176,269 | 10/1939 | Morse | 73—482 |
| 2,350,077 | 5/1944 | Smith. | |
| 2,359,470 | 10/1944 | Eddison. | |
| 2,524,407 | 10/1950 | Trindle | 73—482 |
| 2,565,732 | 8/1951 | Koertge et al. | |
| 2,647,398 | 8/1953 | Marvel | 73—486 |
| 2,992,489 | 7/1961 | Karrels. | |
| 3,096,655 | 7/1963 | Peterson | 73—483 |

FOREIGN PATENTS

| | | |
|---|---|---|
| 11,350 | 1914 | Great Britain. |
| 637 | 1915 | Great Britain. |
| 177,509 | 3/1922 | Great Britain. |

RICHARD C. QUIESSER, *Primary Examiner.*

ROBERT L. EVANS, *Examiner.*

J. G. MURRAY, JAMES J. GILL, *Assistant Examiners.*